United States Patent [19]

Löpponen et al.

[11] Patent Number: 5,625,878
[45] Date of Patent: Apr. 29, 1997

[54] METHOD OF ALLOCATING RADIO CHANNELS

[75] Inventors: Jussi Löppönen, Helsinki; Markku Rautiola, Tampere, both of Finland

[73] Assignee: Nokia Telecommunications OY, Espoo, Finland

[21] Appl. No.: 608,034

[22] Filed: Feb. 28, 1996

Related U.S. Application Data

[63] Continuation of Ser. No. 232,216, filed as PCT/FI92/00290, Oct. 28, 1992, abandoned.

[30] Foreign Application Priority Data

Nov. 11, 1991 [FI] Finland .................................. 915309

[51] Int. Cl.⁶ .................................................. H04Q 9/00
[52] U.S. Cl. ........................ 455/34.1; 455/34.2; 455/54.1
[58] Field of Search ............................. 455/34.1, 34.2, 455/53.1, 54.1, 54.2, 56.1, 33.1, 33.2, 32.1; 379/58, 59, 60, 63

[56] References Cited

U.S. PATENT DOCUMENTS

| | | | |
|---|---|---|---|
| 4,434,506 | 2/1984 | Fujiwara et al. | 455/53.1 |
| 4,551,852 | 11/1985 | Grauel et al. | 455/33.1 |
| 4,850,033 | 7/1989 | Eizenhofer et al. | 455/56.1 |
| 4,870,408 | 9/1989 | Zdunek et al. | 340/825.03 |
| 5,034,993 | 7/1991 | Sasuta et al. | 455/11 |
| 5,119,393 | 6/1992 | Dahlin et al. | 375/5 |

FOREIGN PATENT DOCUMENTS

| | | |
|---|---|---|
| 2069799 | 8/1981 | United Kingdom . |
| 2165127 | 4/1986 | United Kingdom . |

*Primary Examiner*—Reinhard J. Eisenzopf
*Assistant Examiner*—Lee Nguyen
*Attorney, Agent, or Firm*—Cushman Darby & Cushman IP Group of Pillsbury Madison & Sutro LLP

[57] ABSTRACT

A channel allocation method in a cellular radio system. The mobile radios have permanently stored in their memories a first group of radio channels scanned in a normal hunt sequence and a second group of radio channels scanned in a comprehensive hunt sequence. When the control channel of a base station is changed, a channel permanently belonging to the first group is allocated as a new control channel to the base station whenever such a channel is available. If a channel belonging to the second group has to be allocated as a control channel, it is transferred temporarily to the first group and the change of group is announced through control channels to the mobile radios. A channel permanently belonging to the first group is re-established as the control channel of a base station as soon as such a channel is available and the freed channel is returned to the second group.

2 Claims, 1 Drawing Sheet

METHOD OF ALLOCATING RADIO CHANNELS

This is a continuation of application Ser. No. 08/232,216, filed as PCT/FI92/00290, Oct. 28, 1992, now abandoned.

FIELD OF THE INVENTION

The invention pertains to a method of allocating radio channels in a radio system, comprising mobile radio stations and several fixed radio stations located separate from one another within a geographical area covered by the radio system, traffic channels and one control channel being allocated to each fixed radio station, and each mobile station having, permanently stored in its memory, a first group of channels of the radio system assigned primarily as control channels, the mobile station searching for a control channel in the first group in a normal hunt sequence, and, stored by updating through control channels, a second group of radio channels assigned primarily as traffic channels but also useable as control channels, the mobile station searching for a control channel in the second group in a comprehensive hunt sequence if the normal hunt sequence is unsuccessful.

BACKGROUND OF THE INVENTION

In cellular mobile radio systems, communication between a fixed radio network and mobile radios takes place on radio channels (pairs of transmitting and receiving frequencies). Radio channels used for transmission of e.g. user speech or data are called traffic channels. In radio systems according to the standard MPT 1343 issued by the British Department of Trade and Industry (DTI) or in other corresponding radio systems a radio channel reserved for signalling between a fixed network and a mobile radio is called a control channel. A control channel also identifies the system and the site of the base station thus functioning as a kind of beacon for mobile radios searching for a suitable control channel.

In two hunt sequences for a control channel defined in the standard MPT 1343, i.e. in an NH sequence (normal hunt sequence) and a CH sequence (comprehensive hunt sequence), a mobile radio scans a number of channels on searching for a suitable control channel (base station) as the connection on the current channel is weakening or lost or a mobile radio is turned on. In the NH sequence a mobile radio scans all the radio channels assigned as control channels. In the CH sequence a mobile radio scans radio channels that are usually traffic channels but may also be used as control channels.

The NH channels are permanently programmed in a mobile radio. It is possible for a radio system to add a new radio channel to the list of NH channels or to withdraw a radio channel therefrom by means of particular signalling messages.

A large trunking system may include even over a thousand radio channels, a principally arbitrary group of which may be radio channels of the CH sequence. However, a list of NH channels to be stored in a mobile radio may usually not include more than 32 channels. It as then important in the system to keep the total number of control channels as close to the number of NH channels as possible to minimize the time the mobile radios require for hunting control channels.

A known solution is to assign an NH channel as a control channel to each base station. However, this is not always possible and, in addition, in the course of time the system will have to change control channels of base stations e.g. due to faults in radio units. A currently free radio channel capable of functioning as a control channel is then assigned as a new control channel. The channel selected is often other than an NH channel. In the course of time, many of the control channels of the system may be CH channels, whereby the hunt sequences for control channels become longer.

If an NH control channel is withdrawn from a base station of the system and said channel is not currently used as a control channel in any other part of the system, the system will have to send information on the withdrawal on all control channels. If, on the other hand, a radio channel that is not used anywhere else in the system is assigned to a base station as a new control channel, this should be announced to all the mobile radios. If there are numerous changes of channel and channels are allocated as control channels at random, the above messages load the control channels heavily.

SUMMARY OF THE INVENTION

The object of the invention is to mitigate the above problems.

This is achieved by an allocation method according to the invention, which is characterized in that a) when the control channel of a fixed radio station is changed, a radio channel permanently belonging to the first group is allocated as a new control channel to the fixed base station whenever such a channel is available, b) if a radio channel belonging to the second group has to be allocated as a control channel to the fixed radio station, said radio channel is transferred temporarily to the first group and the change of group is announced through control channels to the mobile stations, c) as soon as a radio channel permanently belonging to the first group is available, it is assigned as a control channel to the fixed radio station, and d) when a radio channel temporarily transferred to the first group is freed from use as a control channel, said channel is returned to the second group and the change of group is announced through control channels to the mobile stations.

The basic idea of the invention is, by means of grouping and reservation of radio channels, to maintain a situation where only NH channels are used as control channels in the system.

The radio channels of the system are divided into groups, the first group including channels scanned in the NH sequence and the second group including channels scanned in the CH sequence. The system favours the channels of the first group in control channel use. If, for one reason or another, a channel of the second group has to be selected as a control channel, it is temporarily transferred to the first group and the change of group is announced to the mobile radios. The system is always apt to re-establish a channel permanently belonging to the first group as a control channel in order that the size of the group might not grow nor the NH sequence be lengthened.

Owing to the invention the radio system uses almost only NH channels as control channels. Thereby the mobile radios find control channels quickly and it is not necessary to transmit signalling relating to changes in channel groups on the control channels.

However, if a CH channel has to be used as a control channel, it is more probable in the solution of the invention than in the prior art systems that the mobile radios receive information thereof since the number of NH channels is restricted to a few dozen and the likelihood of not exceeding the limit is higher with the method of the invention than with the prior art method.

BRIEF DESCRIPTION OF THE DRAWINGS

In the following, the invention will be described in greater detail by means of a preferred embodiment, with reference to the attached drawing, wherein.

DETAILED DESCRIPTION OF THE INVENTION

Figure 1:
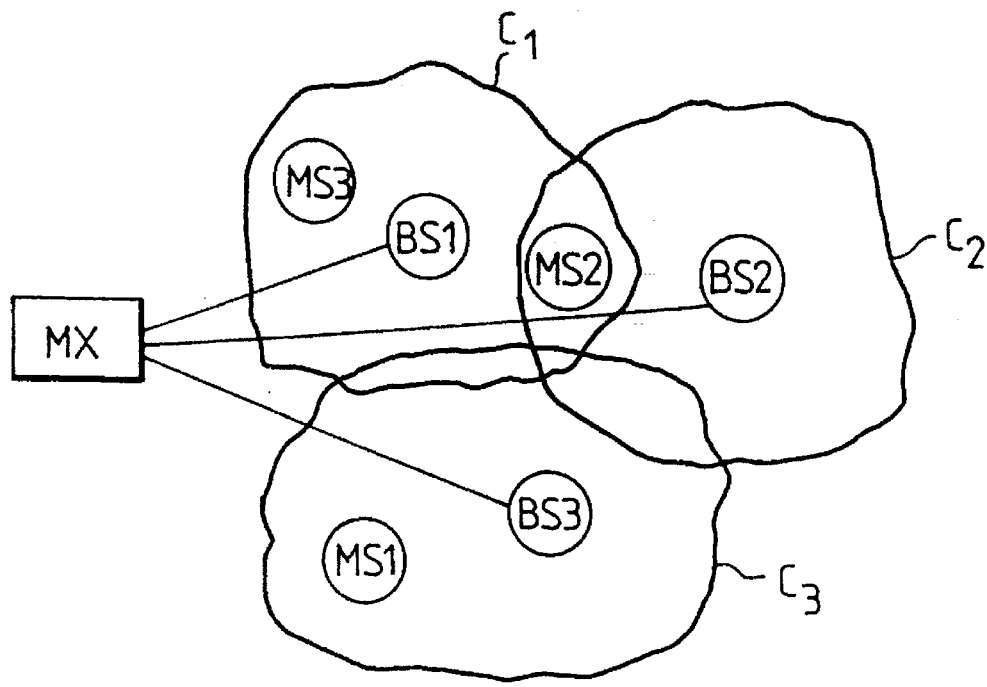
FIG. 1 illustrates a radio system where the invention can be applied.

FIG. 1 shows a mobile radio system of a trunking type, the geographical area covered by the system being divided into smaller radio areas or cells C1, C2 and C3 such that adjacent cells advantageously overlap in their peripheral areas. Each cell C1, C2 and C3 includes at least one fixed multi-channel transceiver apparatus BS1, BS2 and BS3, which in this connection is called a base station. The base stations BS1, BS2 and BS3 are connected to a mobile exchange MX by means of fixed transmission lines, such as cables. A system of this kind is described e.g. in British Patent Application 2,165,127 and its cross references.

For speech or data calls predetermined radio frequencies or radio channels (pairs of transmitting and receiving channels) are assigned to the radio system, the base stations BS establishing radio connections on said radio channels with the mobile radio stations or mobile radios MS moving within the cells. In the preferred embodiment the mobile exchange MX allocates said radio channels to base stations call per call on a so called dynamic allocation scheme such that the same frequencies are not used simultaneously at adjacent base stations, which could interfere with one another.

Figure 2:
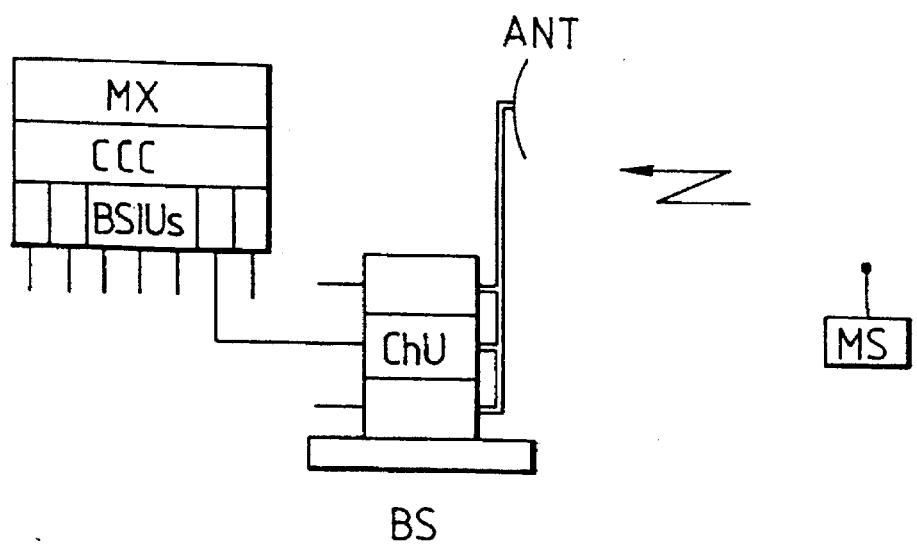
FIG. 2 illustrates an interconnection between a mobile exchange and a base station.

FIG. 2 illustrates an interconnection between a mobile exchange MX and a base station BS. The mobile exchange MX comprises a plurality of base station interface units BSIU, each of them operating as a link between a call control computer CCC and a channel unit ChU of the base station. Each base station BS has several channel units ChU, each ChU comprising a radio transceiver. The call control computer CCC of the mobile exchange MX allocates free radio channels, channel units ChU and base station interface units BSIU for each call in which one or more mobile radios MS of the exchange MX participates. For each call, the mobile exchange MX may command the channel unit ChU to operate on a desired radio channel to perform the above dynamic allocation.

The base station interface unit BSIU has four main functions: to control access to a radio channel associated therewith, to transform and forward messages between radio or channel units ChU and a call control computer CCC, to switch the speech paths of the exchange to a radio channel and to control the operation of the base station. One BSIU controls one channel, which may be either a traffic channel or a control channel. In both cases the BSIU receives messages from the call control computer CCC, controls the 4-wire speech and signalling connection between the exchange and the base station and transmits control data to the call control computer CCC relating to the states of the transmitter, base station and transmission lines.

In a control channel mode of operation the BSIU may operate as a dedicated control channel, undedicated control channel or time-shared control channel. The control channel is a radio channel which is reserved for signalling between a fixed network and a mobile radio for call set up, registration of mobile radios, transmission of status and data messages and broadcasting of network information to mobile radios. Each mobile radio responds only to a control signal of the single base station to which it is currently registered and signals back to the system (exchange) only through said base station on receiving the control signal. During a call a mobile radio does not normally receive or transmit on a control channel.

In accordance with MPT 1343 a mobile radio leaves a control channel (base station) e.g. when the number of erroneous messages exceeds a preset limit or when a much better adjacent control channel is available.

The search for a control channel is carried out primarily in accordance with MPT 1343. The base station BS transmits a SYS code on a control channel, the code enabling the mobile radio MS to identify the system. The SYS code contains an AREA code, which informs the mobile radio MS of the calling area (area of a particular mobile exchange MX) and announces whether or not re-registration is necessary. MPT 1343 specifies the five different hunt procedures or sequences below.

Resuming a control channel sequence RCC, where after the call the MS returns to the control channel it was listening to if the system has not commanded it to take up another control channel.

Single channel hunt sequence SCH, where the mobile exchange MX may command the MS to take up a particular control channel. This procedure is also used when the MS is switched on and the number of the control channel and base station site used earlier are fetched from the memory of the MS.

If the RCC or SCH is unsuccessful, preferential hunt sequence PH is carried out, first scanning the channels that are stored in the data table (ASD table) of the adjacent base stations. For further studying, the base stations with control channels having a field strength stronger than L1 are selected. If a control channel is not found in the ASD table (or the table is empty), all the control channels of the system are scanned. In this procedure only a control channel that does not require re-registration (has the same AREA code as the old control channel) are accepted.

If the PH is unsuccessful, the MS is switched on or the previous control channel is lost, normal hunt sequence NH is carried out, first scanning the channels in the ASD table. If a control channel is not found in the ASD table, all the control channels in the channel table are scanned in a dedicated system by using threshold levels L2, L1 and L0 in the same way as in the PH. In this procedure all AREA codes are accepted.

If the NH is unsuccessful, comprehensive hunt sequence CH is carried out, scanning all the channels in the channel table, including those assigned as traffic channels. The hunt is performed by using threshold levels L1, L2 and L0 in the same way as in the NH.

Each mobile exchange MX and each mobile radio MS have in their memory a channel table listing all the radio channels assigned to the system (usually not more than 250). For each channel, the channel table of a mobile radio has a control byte where each bit b0–b7 contains the information whether the definition corresponding thereto is in force. Such definitions are e.g. control channel (b0), free channel (b1), forbidden channel (b6), measured channel (b7), channel included in a comprehensive hunt sequence (b2), simplex channel for direct MS-MS use (b3), simplex channel for a pager (b4) and time-shared control channel (b5). The bit b5 corresponding to a time-shared control channel contains the information that the channel is a time-shared control channel in some part of the system. In some other part the channel may be a dedicated control channel or a traffic channel.

When a mobile radio is switched on, the channel table is read from the non-volatile memory to the RAM. The radio system may change some bits in the channel table stored in the RAM with BCAST signalling messages. The changes are in force only until the power is switched off. The following is a description of some exemplary BCAST messages.

BCAST (sysdef=00000), Announce CC. By the message control channels are added to the channel table.

BCAST (sysdef=00001), Withdraw CC. By the message control channels are withdrawn from the channel table.

BCAST (sysdef=00100), Adjacent site CC. The message announces the control channels of the adjacent base station sites and announces whether the control channels are time-shared or dedicated. The channel number and the corresponding SYS code are stored in the data table (ASD table) of the adjacent base stations. The table is erased as a control channel is accepted. The channels in the ASD table are the first to be scanned when the search for control channels is commenced.

BCAST (sysdef=00101), Vote now advice. The message is used to announce the active adjacent control channels in a dedicated system to a mobile radio MS.

A mobile radio MS scans the channel table such that the control channel to be measured next is selected at random. When the MS measures a channel which is not a time-shared control channel (b6=0), it marks the channel with "measured" information (bit b7=1), whereby said channel will not be measured again during the same hunt sequence. Time-shared control channels (b6=1) are measured and re-measured since it is not possible to know which one of the base stations BS using the control channel in question is currently transmitting. The aim is to listen to the control channels of all the base stations.

In the radio system according to the invention only channels which are permanently programmed to mobile radios as NH channels (b0=1) are to be used as control channels.

Therefore the radio channels of the system are divided into groups, the first group consisting of channels scanned in the NH sequence (b0=1) and the second group consisting of channels scanned in the CH sequence (b2=1). The system favours the channels of the first group in control channel use such that on changing the control channel of a base station, a radio channel permanently belonging to the first group is allocated as a new control channel to the base station, whenever such a channel is available. If, for one reason or another, a channel of the second group has to be selected as a control channel, it is temporarily transferred to the first group (by setting b2=0, b0=1) and the change of group is announced to the mobile radios by the Announce CC message. To avoid increase in the size of the NH channel group and lengthening of the NH sequence, the system is always apt to re-establish a channel permanently belonging to the first group as a control channel immediately when such a channel is available. Likewise, as soon as a radio channel temporarily transferred to the first group is freed from use as a control channel, the channel is returned to the second group (by setting b0=0 and b2=1) and the change of group is announced through control channels to the mobile radios.

In an embodiment of the invention the radio channels that can be used only as traffic channels are prioritised also in view of use as traffic channels by placing them in a third and fourth group of channels. A channel assigned to the third group is then preferred in selection of a traffic channel. If a free traffic channel is not found in the third group, the channels of the second group are searched. If there are no free channels in the second group, either, the channels of the first group are searched. The last channels to be searched are those of the fourth group. The aim is to keep channels suitable for use as control channels free of use as traffic channels as long as possible.

The drawing figures and the description thereof are intended only to illustrate the instant invention. The method according to the invention may vary in its details within the scope of the attached claims.

We claim:

1. A method of allocating radio channels in a radio system, comprising mobile radio stations and several fixed radio stations located separate from one another within a geographical area covered by the radio system, traffic channels and one control channel being allocated to each fixed radio station, and each mobile station having, permanently stored in its memory, a first group of channels of the radio system assigned primarily as control channels, the mobile station searching for a control channel in the first group in a normal hunt sequence, and each mobile station further having, temporarily stored in its memory and updated through control channels by the fixed radio stations, a second group of radio channels assigned primarily as traffic channels but also useable as control channels, the mobile station searching for a control channel in the second group in a comprehensive hunt sequence if the normal hunt sequence is unsuccessful, in which method changing of a control channel of a fixed station comprises the steps of:

a) allocating a radio channel permanently belonging to the first group as a new control channel to the fixed base station whenever such a channel is available, b) allocating a radio channel belonging to the second group as a new control channel if a radio channel permanently belonging to the first group is not available, transferring said radio channel belonging to the second group temporarily to the first group and announcing the change of group through control channels to the mobile stations, c) assigning a radio channel permanently belonging to the first group, as a control channel of the fixed radio station as soon as it becomes available, and d) returning a radio channel temporarily transferred to the first group back to the second group, when said channel is freed from use as a control channel, and announcing the change of group through control channels to the mobile station;

the radio channels assigned only as traffic channels being in third and fourth groups of radio channels, and selection of traffic channels for a call comprises the steps of:

e) making a first search for a traffic channel among the channels belonging to the third group, f) making a further search for a traffic channel among the channels belonging to the second group, if there are no free channels available in the third group, g) making a still further search for a traffic channel among the channels belonging to the first group, if there are no free channels available in the second group, and h) making a still further search for a traffic channel among the channels belonging to the fourth group, if there are no free channels available in the first group.

2. A method for allocating radio channels in a radio system which includes a plurality of mobile radio stations, a plurality of fixed radio stations located within a geographical area covered by the radio system, each fixed radio station having a plurality of channel units each comprising a radio transceiver for transmitting and receiving on a radio channel, a mobile exchange having a call control computer and a plurality of interface units each operating as a link between the call control computer and a respective channel unit of a respective fixed radio station, the call control computer being capable of allocating free radio channels, channel units and interface units for each call in which at least one mobile radio station of the radio system participates, said method comprising:

(a) allocating radio channels potentially available for use by said transceivers for communicating with said mobile radio stations, into:

(i) a smaller, first group which, when used, are to be used as control channels reserved for signalling between a fixed radio station and a mobile radio station for at least one of call set up, registration of a mobile radio station to a fixed radio station, transmission of a status message and broadcasting of network information to mobile radio stations, and for signalling by a mobile radio station back to the mobile exchange via a fixed radio station upon receiving a control signal via a fixed radio station, but normally for receiving or transmitting by a mobile radio station while a call involving such mobile radio station is in progress, and (ii) a larger, second group which, when used, are to be used, unless temporarily co-opted, as traffic channels for passing communications traffic to and from the mobile radio stations within calls;

(b) providing each mobile radio station with a nonvolatile memory storing a channel table listing all of said allocated radio channels including a default listing of which of said radio channels are in said first group and which of said radio channels are in said second group, and a volatile memory into which said channel table, including said default listing, is read when the respective mobile radio station is turned on;

(c) monitoring by said mobile exchange of the number and distribution of radio channels currently useable as control channels currently allocated to said first group;

(d) as a result of said monitoring, when said radio channels currently useable as control channels currently allocated to said first group drop to a low value which is below a threshold value absolutely or geographically, temporarily reallocating one or more radio channels from said second group to said first group, and signalling to said fixed radio stations for transmission thereby to said mobile radio stations control signals which upon reception by said mobile radio stations alter said channel table as existing in the volatile memory of each mobile radio station when turned on, to correspondingly revise said listing of which of said radio channels are currently in said first group and which of said radio channels are currently in said second group;

(e) as a result of said monitoring, when said radio channels currently useable as control channels currently allocated to said first group and contained in said default listing after step (d) has been conducted raise to a higher value than said low value, absolutely or geographically, immediately reallocating to said second group one or more of the radio channels which were temporarily allocated from the second group to the first group in step (d), and signalling to said fixed radio stations for transmission thereby to said mobile radio stations control signals which upon reception by said mobile radio stations alter said channel table as existing in the volatile memory of each mobile radio station when turned on, to correspondingly revise said listing of which of said radio channels are currently in said first group and which of said radio channels are currently in said second group;

(f) upon each such revision allocating a respective at least one radio channel presently in the first group to each said fixed radio station for use as a respective control channel;

(g) each said mobile radio station, when in a turned on status and at a loss for but in need of an effective control channel communicating relationship with a fixed radio station attempting to perform at least one of:

(i) a resuming control channel sequence, in which the mobile radio station returns to the control channel it was listening to most immediately previously;

(ii) a single hunt sequence, in which the mobile radio station takes up a particular control channel as commanded by the mobile exchange;

(iii) a preferential hunt sequence, in which the mobile radio station scans for control channels as stored in a data table of adjacent ones of said fixed radio stations and selects therefrom one control channel having a field strength which is stronger than a threshold value of field strength; and (h) when, after conducting step (g) a mobile radio station, when in a turned on status remains at a loss for but is in need of an effective control channel communicating relationship with a fixed radio station, performing a normal hunt sequence, in which the radio channels currently carried in the listing in the volatile memory of the respective mobile radio station as being in the first group are scanned, and one of them, being free, is selected by the mobile radio station as an effective control channel.

* * * * *